United States Patent [19]
Helmle et al.

[11] Patent Number: 4,907,538
[45] Date of Patent: Mar. 13, 1990

[54] MULTIPLE BIN COW FEEDER

[75] Inventors: Fred J. Helmle; Scott M. Helmle, both of Little Suamico, Wis.

[73] Assignee: Little Suamico Products Inc., Little Suamico, Wis.

[21] Appl. No.: 190,773

[22] Filed: May 9, 1988

[51] Int. Cl.$^4$ ............................................. A01K 5/00
[52] U.S. Cl. ................................. 119/51.01; 119/57.6
[58] Field of Search ............... 119/51 R, 52 B, 52 AF

[56] References Cited

U.S. PATENT DOCUMENTS

| | | | |
|---|---|---|---|
| 3,265,227 | 8/1966 | Vratil et al. | 119/52 B |
| 3,587,529 | 6/1971 | Wienert et al. | 119/52 B X |
| 4,597,361 | 7/1986 | Tudela | 119/52 B |
| 4,672,917 | 6/1987 | Fox | 119/52 AF |
| 4,712,511 | 12/1987 | Zamzow et al. | 119/51 R |

FOREIGN PATENT DOCUMENTS

| | | | |
|---|---|---|---|
| 2382853 | 11/1978 | France | 119/52 B |
| 609521 | 6/1978 | U.S.S.R. | 119/52 B |
| 1033094 | 8/1983 | U.S.S.R. | 119/51 R |
| 1055447 | 11/1983 | U.S.S.R. | 119/52 B |
| 1080801 | 3/1984 | U.S.S.R. | 119/51 R |
| 1109097 | 8/1984 | U.S.S.R. | 119/51 R |
| 2037559 | 7/1980 | United Kingdom | 119/52 B |
| 2063639 | 6/1981 | United Kingdom | 119/51 R |

Primary Examiner—Paul J. Hirsch
Attorney, Agent, or Firm—Leo J. Aubel

[57] ABSTRACT

An animal feeder comprising a movable cart having multiple bins for containing feed supplements. Respective augers are positioned in the bins to dispense the feed in response to control signals received from a preprogrammed microprocessor.

9 Claims, 4 Drawing Sheets

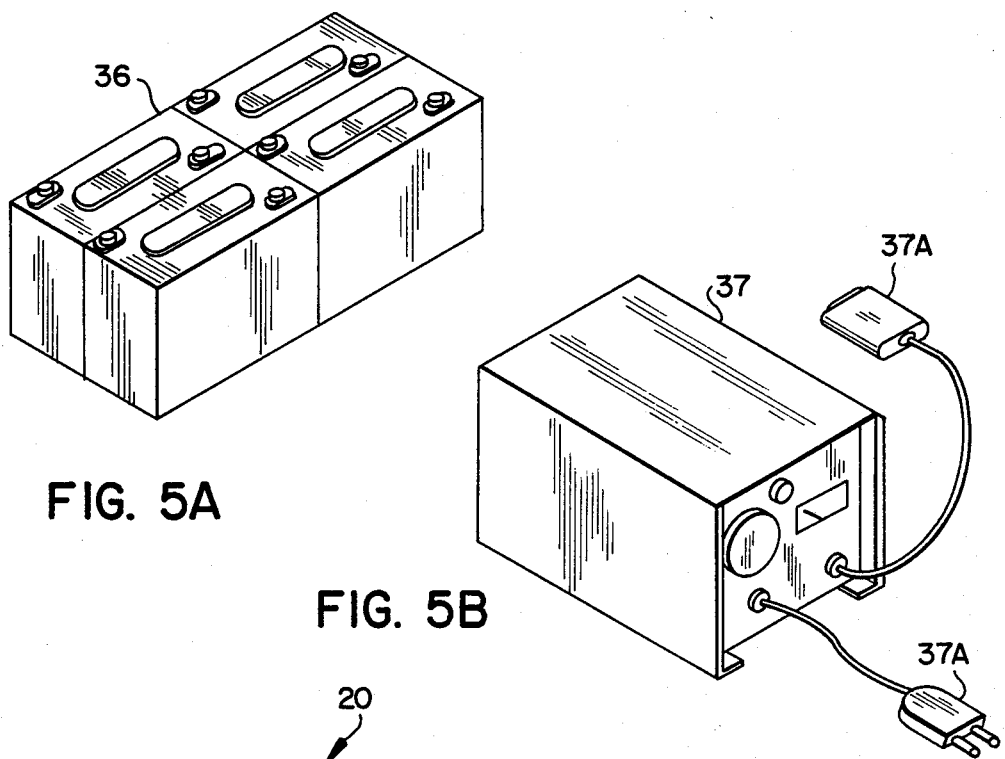
FIG. 5A
FIG. 5B
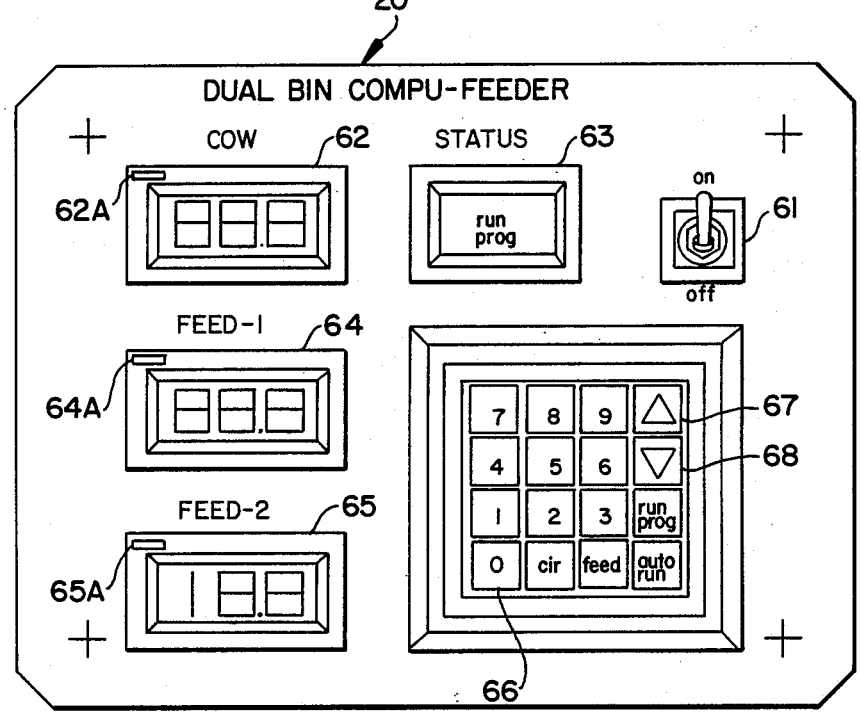
FIG. 6

MULTIPLE BIN COW FEEDER

DESCRIPTION

BACKGROUND OF THE INVENTION

The invention pertains to animal feeders of the automatic type, wherein animals, such as dairy cows, may be fed different feed supplement components concurrently from respective feed dispensers, and wherein the feed is dispensed from a movable cart and the dispensing is controlled by a microprocessor system mounted on the cart.

In order to maintain a healthy dairy herd and achieve maximum milk production it is now known that it is necessary to provide a feed dispensing apparatus which controls supplemental feed to predetermined cows. Cows in a herd each have different feed requirements and individual lactic feed cycles. Therefore, each of the cows should be fed different amounts of feed supplement for maximum benefit to the cow and maximum output from that cow. Frequently, two separate feed supple ments are fed to the herd. Accordingly, it is desirable to control the amount of each of the feed complements provided to each cow. For example, if there are 200 cows in the herd, prefer ably 400 different individual portions of supple mental feed should be provided.

SUMMARY OF INVENTION

The present invention is directed to a dual-feed dispenser system wherein the cows are fed individually from a cart which is movable from one feed station to the next feed station. The system comprises a cart for containing supplemental feed which is moved past each individual cow feeding station.

A microprocessor based dispensing system is provided for the cart. Initially, a code number indicating each cow in the herd is entered into the microprocessor memory as well as the amount of feed supplement to be fed to the cow. In operation, the operator manually drives or steers the cart to a selected feed station. The operator then enters the number assigned to the cow through the keyboard. The operator then presses the Feed key and a dispensing control is actuated to dispense a preselected combination of feed supplement to each particular cow. Other objects and advantages of the invention will become more apparent from the following detailed description taken in connection with the accompanying drawings.

DRAWINGS

Figure 1:
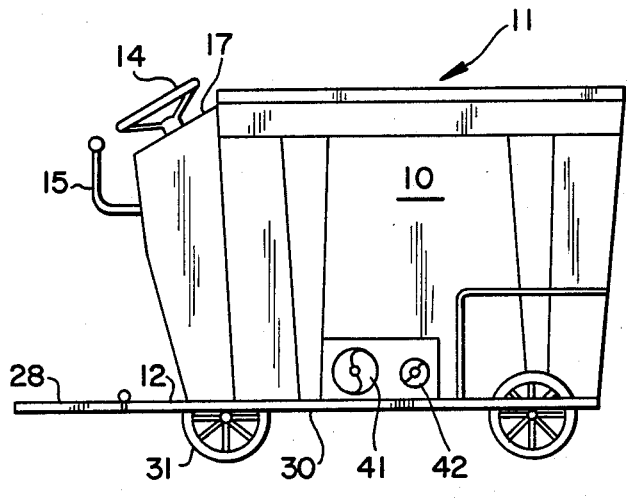
FIG. 1 is a side view of the animal feeder apparatus or cart of the invention.
Figure 7:
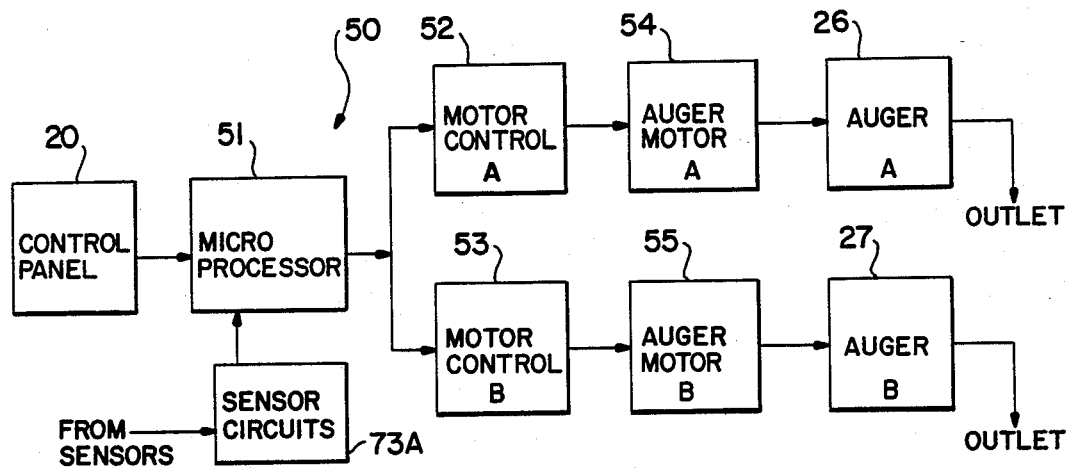
Figure 8:
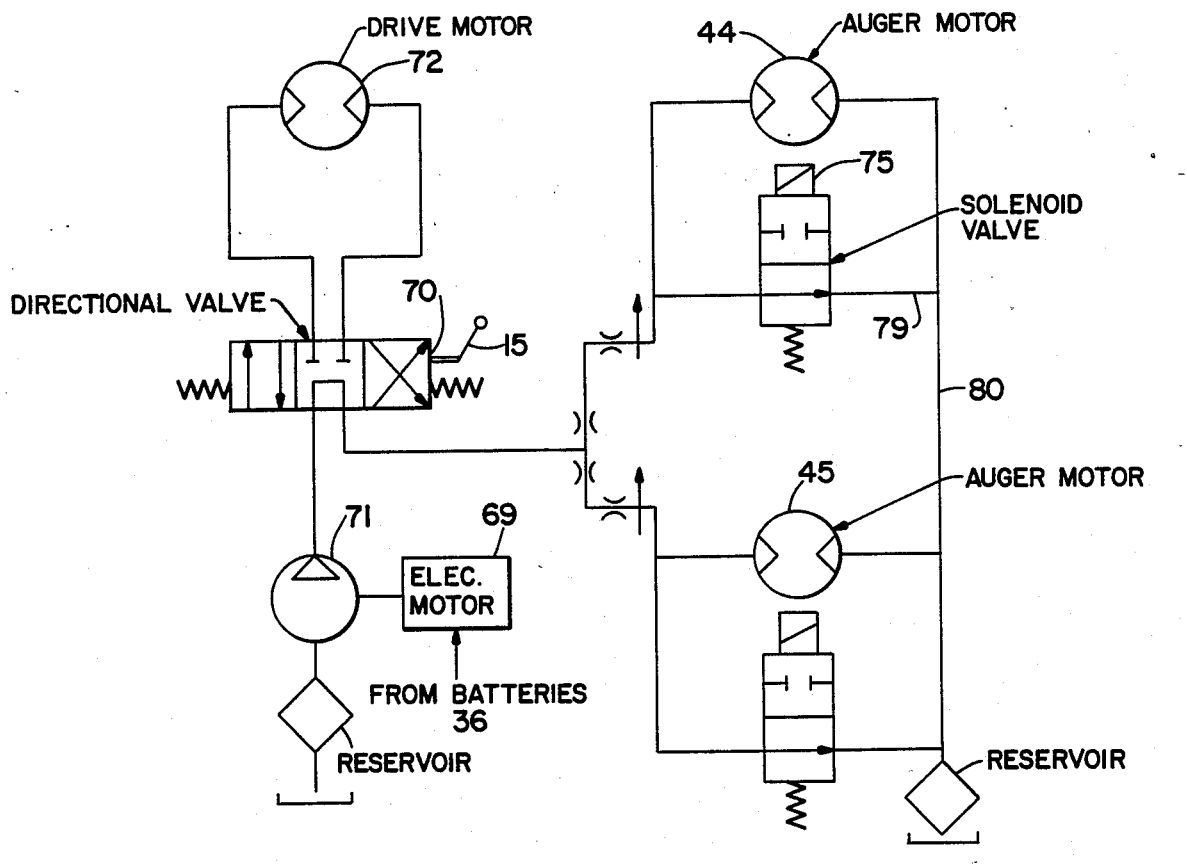
Figure 9:
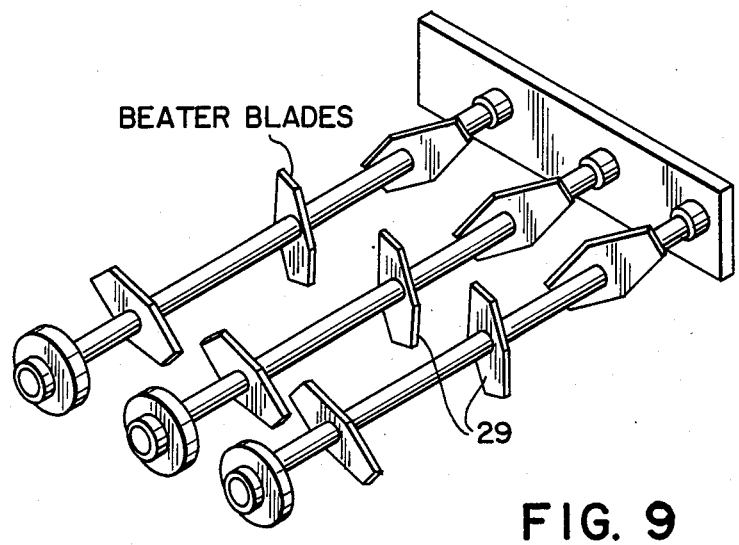

FIG. 5(A) and 5(B) show the battery group and a recharging unit;

FIG. 6 shows the microprocessor based control panel for the apparatus of FIG. 1;

FIG. 7 shows a block diagram of the microprocessor based control system for the apparatus of FIG. 1;

FIG. 8 is a diagram of the hydraulic drive system for the feed apparatus;

FIG. 9 shows agitator blades; and

Figure 10:
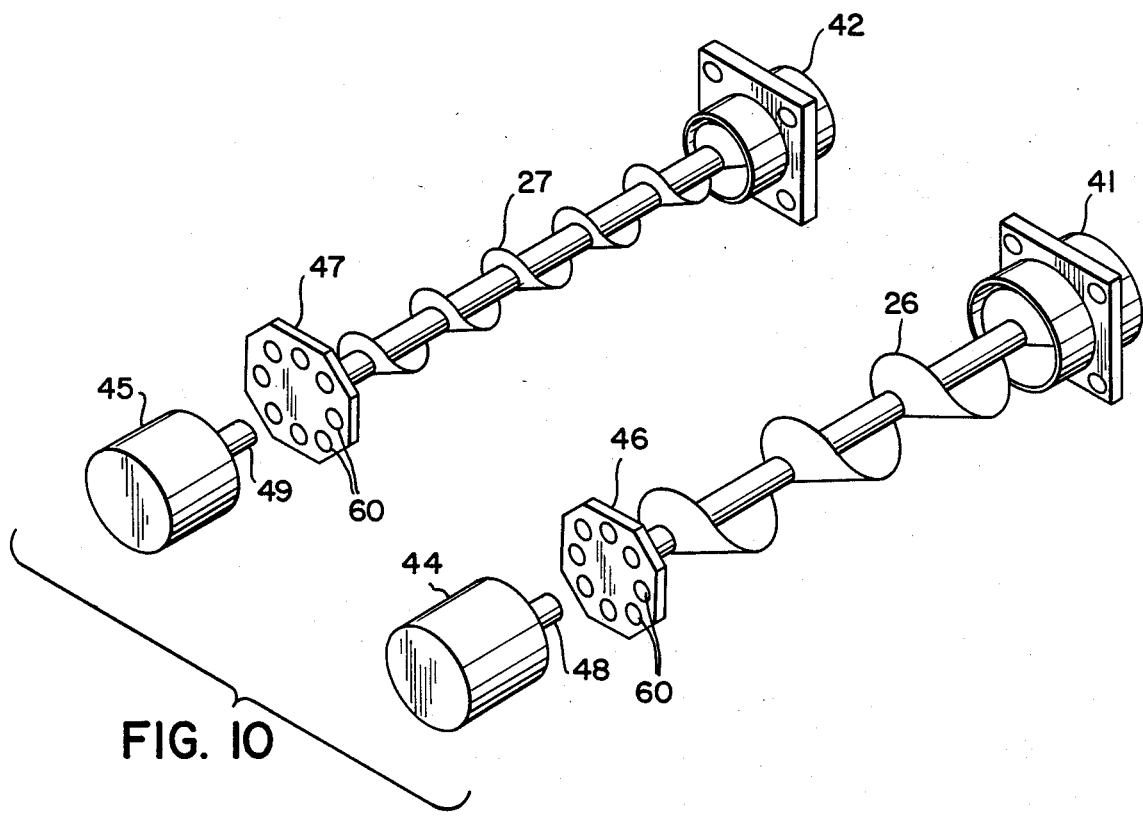

FIG. 10 shows the augers for driving the feed supplement.

DESCRIPTION OF INVENTION

Figure 2:
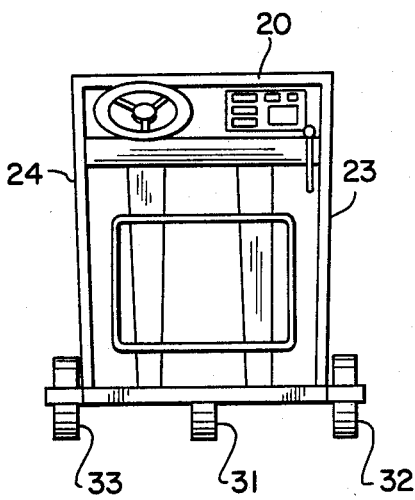
FIG. 2 is a back view of the animal feeder apparatus of FIG. 1, showing the steering mechanism and the control panel.

FIG. 1 shows the inventive feeder apparatus or cart 11. As indicated in FIG. 1, feeder cart 11 includes a box-like fiberglass housed body 10 mounted on a steel frame structure 30. A platform 12 extends rearwardly from frame 30 to support a standing operator to facilitate operating and steering the cart 11 as by a steering wheel 14 and clutch handle 15. Handle 15 is mounted on body 10 in position to permit manipulation to enable forward and rearward drive of cart 11. The steering wheel 14 is mounted on an inclined angled surface 17 of body 10 to permit convenient steering of cart 11 by the operator. Also, a microprocessor control panel 20 is mounted on angled surface 10 as will be described hereinbelow, see FIG. 2.

Figure 3:
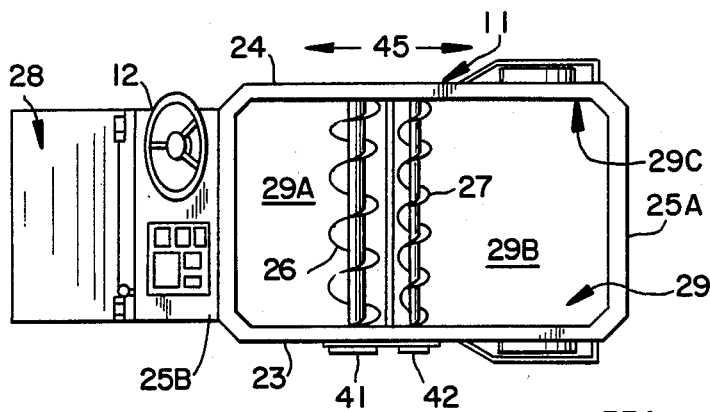
FIG. 3 is a top view of the apparatus of FIG. 1, showing the augers mounted in respective bins.

As mentioned, the body 10 of cart 11 is a box-like structure with an open top 29C (see FIG. 3) for conveniently receiving the feed supplement to be dispensed. Body 10 includes sides 23 and 24, a front end 25A, and a rear end 25B, all of which may be made of panel sections to facilitate forming the cart 11 body and for conveniently opening the sides for ease of servicing the internal parts of components of the cart 11. Note from FIG. 2 that the sides 23 and 24 are inclined inwardly from top to bottom. As well as making for a pleasing appearance, this also tends to channel the feed inwardly to enable better dispensing.

Cart 11 is a three-wheeled vehicle with a rear steerable drive wheel 31 and two forward wheels 32 and 33. Importantly, the two drive wheels 32 and 33 are mounted on a shaft 34 to extend outwardly form the frame 30, as can be most clearly seen in FIGS. 2 and 3. This has been found necessary in order to provide stability to the cart 11 and prevent the cart from tipping over. Fenders 32A and 33A extends outwardly of the wheels 32 and 33 to protect the wheels.

Figure 4:
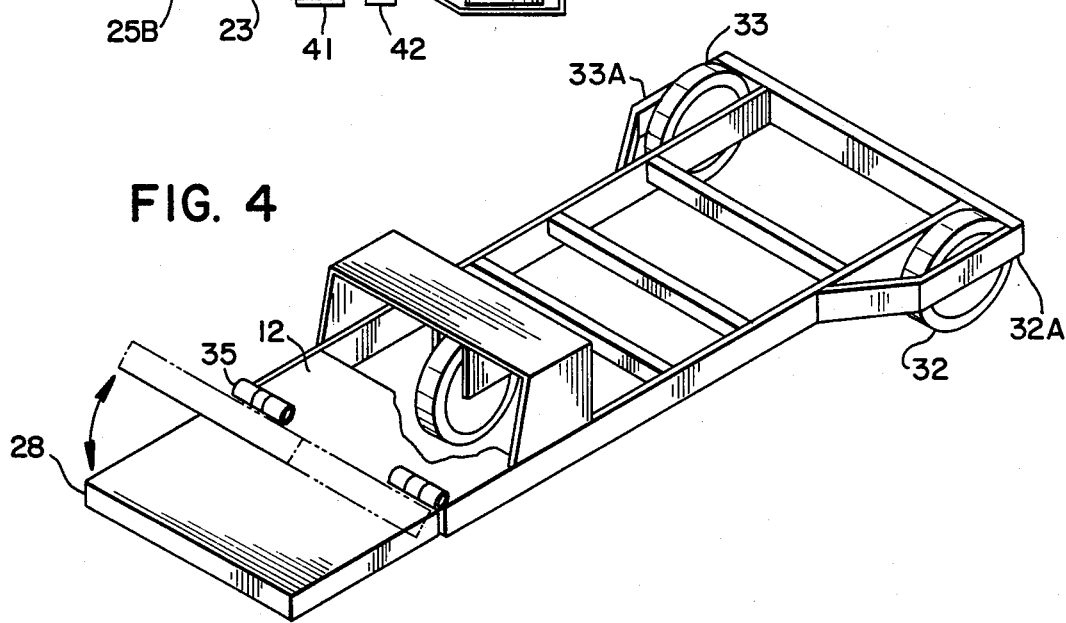
FIG. 4 is a view of the supporting frame structure of FIG. 1.

Also importantly, the cart 11 may have to operate in confined quarters and hence the size and length of the cart 11 is important. In one embodiment the length of the cart is 78"; the width is 34", the height is 57", the wheel base is 40", and the height of the feed discharge outlets (to be explained) is 10". In order to provide a support for the operator (as shown in FIG. 1) while permitting the cart 11 to turn in narrow aisles and confined corners, the platform 12 includes a pivotable section 28 (see also FIG. 4), which is affixed to platform 12 as by hinges 35. When it is necessary to steer the cart 11 around a tight corner the operator can get off of the platform 12 and pivot or move section 28 upwardly (that is, fold section 28 up) to effectively shorten the length of cart 11 and thus permit the cart to be steered around the corner.

As mentioned above, the body 10 is preferably made in sections such as to facilitate placing batteries in the cart, as well as for servicing the cart.

FIG. 5A shows a group of rechargeable NICAD batteries 36 for providing electrical energy to drive the cart. FIG. 5B shows a battery charger 37 which is conveniently connected to a suitable source of 110 V A.C. to recharge the batteries. Charger 37 includes terminals 37A which are readily connected to and disconnected from the batteries 36 and the A.C. power. Since the batteries 36 are relatively heavy and in order to add stability to the cart, the batteries 36 are preferably mounted in cart 11 in a low position; that is a position contiguous to frame 30, preferably centrally over the wheels 32 and 33. (see FIGS. 1 and 4)

As mentioned, body 10 has an open top 29C to effectively form a large container 29. One or more bin dividers 45 divide the container 29 into dual compartments or bins 29A and 29B. Each of the bins 29A and 29B can be loaded with the feed supplement to be dispensed to the cows.

Respective augers 26 and 27 are mounted in the bins 29A and 29B. The augers 26 and 27 are mounted in a low position in bins 29A and 29B to be, in effect, gravity-fed by the feed supplement in the bins. The augers 26 and 27 are mounted to extend laterally between side 23 and 24 of body 10. The augers 26 and 27 connect to outlets 41 and 42 formed on side 23 of body 10. As is known, as the augers 26 and 27 rotate they will push feed which is in bins 29A and 29B out through the outlets 41 and 42.

The amount of feed fed through the outlets is a function of the particle size of the feed, the size, pitch and diameter of the auger, and, importantly, the number of rotations of the auger. THe number of rotations of the auger per feed cycle determines the amount of feed dispensed.

As shown in FIG. 8, each auger is driven by a hydraulic motor 44 and 45 to rotate (the hydraulic system will be described below). Counterwheels 46 and 47, each with a plurality of holes generally indicated as 60 (in one embodiment there are ten holes) is mounted on the respective shafts of the augers 26 and 27. Proximity switches 48 and 49 of known design are mounted adjacent to counterwheels 46 and 47 and sense the rotation of the counterwheel by sensing the rotation of the holes 60 in the counterwheels as the holes pass the switch locations. The number of pounds of feed supplement dispensed from each of bins 29A and 29B is thus measured by the rotation of the counterwheels 46 and 47 and hence of the augers 26 and 27. Accuracies of 1/10 of a pound are obtainable.

In one embodiment, the augers 26 and 27 are of different sizes to permit convenient dispensing of different types of feed supplements. Also, the divider wall 45 is pivotable as indicated by the arrowed line to effectively enlarge the size of one bin while reducing the size of the other bin. For certain applications, it is desirable to stir or agitate the feed and for this purpose agitator blades such as 29 may be mounted in the bins 29A and 29B. The agitator blades 29 may be manually or motor driven.

In order to select the amount of feed to be fed to each cow and hence to control the rotation of the augers, a microporcessor based system 50, as indicated in FIG. 7, is provided for cart 11.

FIG. 7 shows a block diagram of the microprocessor based control system 50 for the augers 26 and 27. The control panel 20 (see Figs. 1 and 6) is connected to a microprocessor 51. The microprocessor 51 is connected effectivley in parallel to auger motor controls 52 and 53. Motor controls 52 and 53 actuate the auger motors 54 and 55 in accordance with the microprocessor 51 output, to control the drive to augers 26 and 27 respectively (as will be explained hereinafter). Microprocessor 51 is programmed to drive augers 26 and 27 to concurrently provide a two-feed supplement to the cow. Note that microprocessor 51 selectively drives each of augers 26 and 27 independently of the other auger, and each auger can be activated for the number of rotations desired, independently of the other auger.

The control panel 20 for the microprocessor system 50 of FIG. 7, is mounted to permit convenient viewing and manipulation of the panel by the operator. As will be described herein, the panel 20 will enable the operator to control the microprocessor system 50 to provide a pre-selected amount of feed to each animal.

In one embodiment, processor system 50 is configures to process feed for up to 400 cows. More specifically, the microprocessor 51 controls the operation of a hydraulic system as shown in FIG. 8 to drive augers 26 and 27 positioned in the bottom of bins 29A and 29B and to push or deliver a selected amount of feed through outlets 41 and 42 formed on side 23 of housing 12 at a desired location.

The rechargeable batteries 36 provide power to the microprocessor 51 through suitable circuitry, as is well known.

FIG. 6 is a relatively enlarged view of microprocessor control panel 20. Control panel includes an on-off toggle switch 61. Panel 20 includes cow number designator display 62, a status display 63 indicating AUTO or PROGRAM modes. Panel 20 includes two feed displays 64 and 65, for indicating amounts of feed. Further, panel 20 includes a numerical keyboard generally designated as 66, with numerical keys 0-9, a Clear key, a Feed key, an Auto/Manual key, a Run/Program key, and Up-Down scan keys 67 and 68.

In operation, the operator turns the toggle switch 61 on, operates clutch handle 15 to engage the drive motor (see FIG. 8) and steers the cart 11 to the selected position. The operator then enters the number of the cow at the selected position into the microprocessor 51 by means of the keyboard 66; for example, cow number 356. The cow number (356) is displayed in display 62 together with an enhancing, a relatively bright, light 62A. The amount of feed to be dispensed to cow number 356 is displayed in Feed displays 64 and 65 together with the enhancing lights 64A and 65A. The Feed key in keyboard 66 is then actuated and the amount of feed pre-programmed for cow 356 is dispensed. Thus a very convenient, straightforward feeding operation is accomplished.

Refer now also to FIG. 8. To propel the cart 11, clutch handle 15 is moved and actuate directional valve 70 of known design. A suitable electric motor 69 powered by the batteries 36 powers a compressor 71 to provide the compressed drive fluid to power the cart 11. Dependent on the position of clutch 15 and thus dependent on the position of directional valve 70, the drive motor 72 drives the cart 11 forward or backward.

Directional valve 70 also couples to the auger motors 44 and 45 which respectively drive augers 26 and 27. Auger motors 44 and 45 are both coupled similarly to directional valve 70, hence a description of the connections of auger motor 44 will apply similarly to auger motor 45.

A two position solenoid valve 75 of known design, is connected across, that is, in parallel with, auger motor 44. Solenoid valve 75 is controlled to a first or second position by an input from microprocessor 51 which selectively opens and closes the valve, in a manner known in the art. When solenoid valve 75 is in a first position, fluid flows through the line 79 connecting the solenoid valve 75 to the fluid circuit 80 and fluid flow is bypassed around the auger motor 44; and, motor 44 is not energized, causing auger 26 (see FIG. 7) to stand still.

When a desired amount of feed is to be dispensed by auger 26 in response to actuation of microprocessor control panel 20, by the operator the solenoid valve 75 is causes to move to a second position. This causes the fluid flow through line 79 to be cut off or stop. The fluid flow will now be directed to flow through motor 44 to energize the motor and cause it to drive auger 26. The motor 44 wil be energized until solenoid valve 75 is moved to its first position dependent on the input from the microprocessor 51. Sensor circuits 73 are coupled to the sensors 48 and 49 to provide input to the microprocessor 51 as is known in the art. As mentioned above, the amount of feed to be dispensed by each auger must be accurately controlled. The feed is dispensed by weight, and the inventive system translates a number of rotations (and degrees of rotation) of the augers 26 and 27 into an equivalent weight of feed. As mentioned above, the counterwheels 46 and 47 contain ten spaced holes on their periphery and through the sensors 48 and 49 and the sensor circuit 73, which provide tight accurate control of the feed dispensing operation.

The microprocessor system 50 can be readily reprogrammed to accomodate up to 400 cows, to change the nubmer of the cows, and/or to change one or both feeds to each cow. Refer now to Fig. 6. The microprocessor panel 20 contains the status display 63 indicating AUTO and PROG modes. When the RUN/PROG key of keyboard 66 is pressed by the operator, it will change from the RUN mode to the PROGRAM mode. To program the microprocessor, the operator enters the PROGRAM mode. A program change can then be manually entered to alter, if desired, the number of a cow or the total number of cows, and the amount of each feed to be dispensed to each cow for the next feeding period by using the keyboard 66.

For the programming operation, the operator will first enter the number of the cow on the numerical keyboard 66, which will then be displayed on the cow number designator display 62, together with an enhanced light on display 62 (to indicate activity in this field). Next, the operator presses the down scan key 67 on the keyboard 66. This activates the Feed-1 designator display 64 and the enhancing light. The amount of feed to be fed to that cow from the Feed-1 bin is then entered as pounds and tenths of pounds of feed, again using numeric keyboard 66. The new feed amount is displayed in the Feed-1 display. Next the operator presses the down scan key 67 and an enhancing light goes on in the Feed-2 designator display 65. The operator then enters the amount of feed to be fed to that cow from the Feed-2 bin, again using numeric keyboard 66 and this new amount is displayed in the Feed-2 designator display 65.

To continue with the next cow, the operator again presses the down scan key 67 on numeric keyboard 66, which activates the cow number designator display 62 and its enhancing light. The above process is then repeated for each cow.

When the operator has finished entering feed data for each cow in the herd, the RUN/PROG key is pressed, returning the status display 63 to RUN mode. The status display 63 will remain in RUN mode. Note that each individual cow's feed data can be changed at any time, without having to re-enter feed data for the entire herd. The Clear key is used to clear an entire program.

While the invention has been particularly shown and described with reference to a preferred embodiment thereof, it will be understood by those skilled in the art that various changes in form and details may be made therin without departing from the spirit and scope of the invention.

We claim:

1. A moveable feed cart including compartments for receiving feed, rechargeable battery means mountable on said cart, hydraulic fluid power means for propelling said cart and driven by said fluid power means, auger means driven by said fluid power means and operable to dispense feed from said compartments, and a microprocessor based control means for controlling the operation of said augers.

2. A moveable feed cart, electric power means mounted on said cart for propelling said cart, a microprocessor system mountable on said cart, said cart having a housing body comprising at least two feed receiving bins, each bin having a feed outlet, auger means mounted in each bin to move feed out through a respective outlet, said microprocessor system selectivley controlling the rotation of said auger means to operate independently of one another to dispense a selected amount of combined feed from said bins.

3. A moveable feed cart as in claim 2 wherein sensor means are provided to sense the respective number of rotations and partial rotations of said augers.

4. A moveable feed cart as in claim 3 including display means wherein said rotation of said auger means is converted into a display of pounds and fractions of pounds of feed.

5. A moveable feed cart as in claim 2 including a control panel for said microprocessor system mounted on said cart, said panel including keyboard means for entering anumber corresponding to an animal for which feed is to be dispensed, and said panel including means for displaying the amount of feed which is to be dispensed from each of said bins.

6. A moveable feed cart as in claim 7 wherein said platform means includes a first stationary section and an upwardly pivotable section.

7. A moveable feed cart as in claim 2 further including platform means movably mounted on said cart suitable for supporting an operator, said platform means being selectively moved to decrease the length of the cart to permit use of the cart in confined areas.

8. A moveable feed cart for selectively feeding animals, microprocessor system mountable on said cart, said cart having a housing body comprising at least two feed receiving bins, each bin having a feed outlet, an auger mounted in each bin to move feed out through a respective outlet, said microprocessor system selectively controlling said augers to operate independently of one another to dispense a selected amount of feed from said bins, control panel means including keyboard means operably connected to said microprocessor system, said keyboard means being operable for entering the preassigned number of the selected animal into said microprocessor system, display means for displaying the number of the animal entered into said system, said display means further displaying a preassigned feed amount to be dispensed to said animal, and said keyboard being operable to initiate the feeding cycle.

9. A system as in claim 8 wherein said microprocessor system includes means for selectively changing the respective number assigned to animals, and means for selectivley changing the feed amounts provided by said system to said animals.

* * * * *